United States Patent [19]
Herbst

[11] 3,771,311
[45] Nov. 13, 1973

[54] POWER SYSTEM

[75] Inventor: Walter A. Herbst, Union, N.J.

[73] Assignee: Esso Research and Engineering Company, Linden, N.J.

[22] Filed: Feb. 1, 1971

[21] Appl. No.: 111,279

[52] U.S. Cl............................ 60/7, 60/39.28, 74/751
[51] Int. Cl. .............................................. F02c 9/04
[58] Field of Search ....................... 74/751; 60/7, 6, 60/10, 39.28, 39.16

[56] References Cited
UNITED STATES PATENTS

| | | | |
|---|---|---|---|
| 3,456,762 | 7/1969 | Dinnerstein...................... | 60/7 A X |
| 3,672,244 | 6/1972 | Nasvytis........................... | 74/751 X |
| 2,803,151 | 8/1957 | Clerk................................. | 74/751 |
| 2,935,899 | 5/1960 | Nallinger.......................... | 74/751 |

Primary Examiner—Martin P. Schwadron
Assistant Examiner—Allen M. Ostrager
Attorney—Manhan & Wohlers and Joseph J. Dvorak

[57] ABSTRACT

An improved power system is provided in which a gas turbine engine, mechanically connected to a flywheel, is adapted to power the flywheel whenever the flywheel falls below a preset standard rotational speed. The flywheel is adapted to deliver energy to power responsive motion producing means. Whenever the rotational speed of the flywheel exceeds a preset standard speed, the turbine engine is deactivated and the turbine wheel rotates freely with the flywheel enhancing its effectiveness.

9 Claims, 1 Drawing Figure

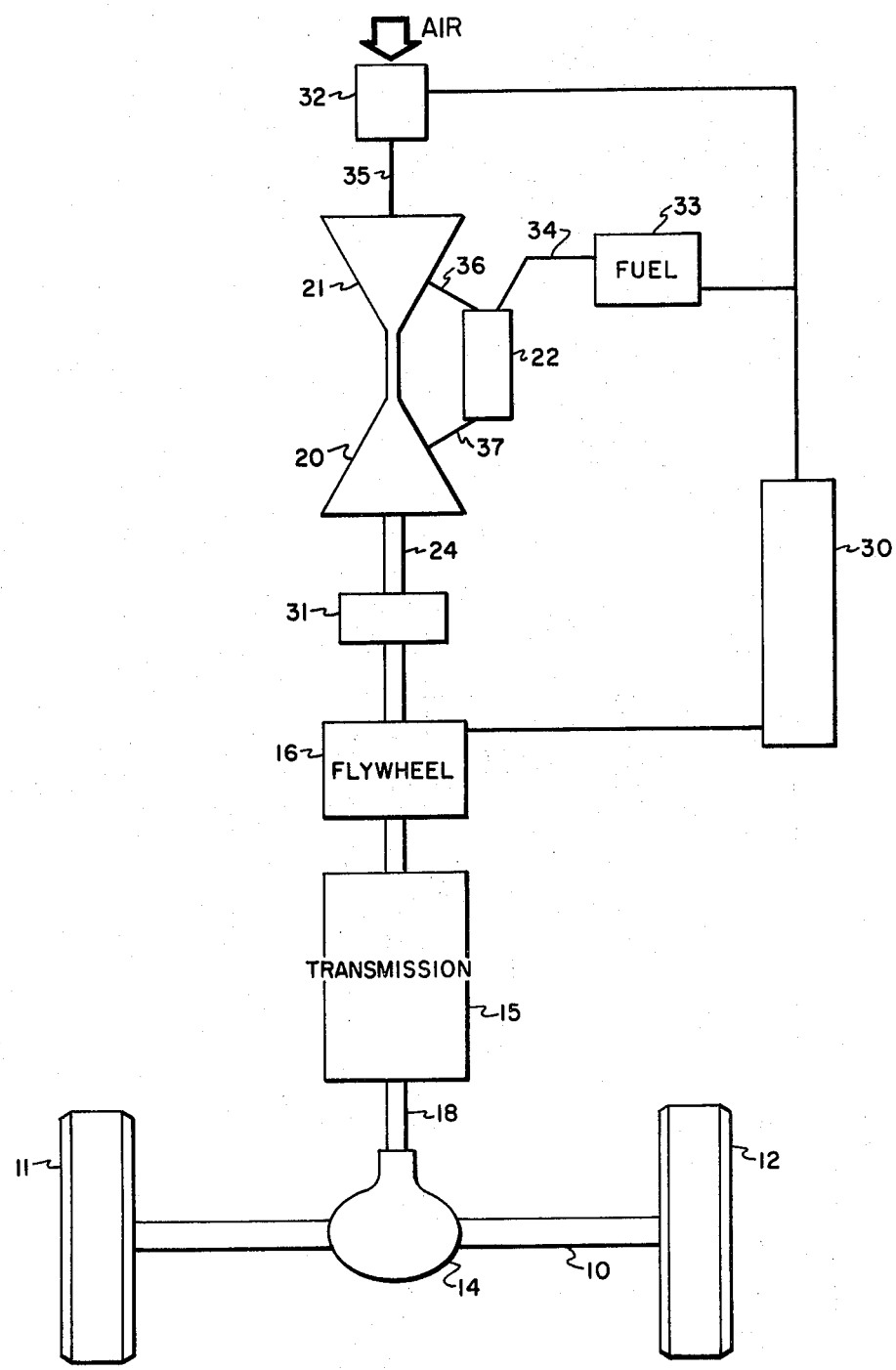

POWER SYSTEM

BACKGROUND OF THE INVENTION

This invention relates to an improved power system for delivering energy from a gas turbine engine to a power-responsive motion producing means. More particularly, this invention relates to a power system for vehicles which can be operated efficiently without producing substantial quantities of air pollutants.

Power systems for mechanical devices, including vehicles, most commonly incorporate a piston driven internal combustion engine to deliver power to produce some movement. Thus, in powering automobiles, an internal combustion piston engine is operatively connected to the drivewheels of the vehicles generally via a drive shaft and variable speed transmission.

The internal combustion engine is most commonly employed because it is capable of delivering full power for acceleration in a relatively short response time; it is low in cost, relatively small and light and reasonably efficient. Unfortunately, the internal combustion engine produces polluting exhaust gases and because of the large number of internal combustion engines that are in use today, air pollution, particularly in urban areas, is of mounting concern.

On the other hand, it is well known that the gas turbine engine produces a relatively clean exhaust, i.e., the exhaust of a simple cyclic gas turbine contains relatively small amounts of carbon monoxide, hydrocarbons, nitrogen oxides and particulate matter. Nonetheless, the use of such engines in power systems for propelling automobiles and the like has been relatively limited because of poor fuel economy and the slow response of the gas turbine engine in delivering maximum power to the drive wheels from an idle condition compared with the rapid acceleration capability of the modern internal combustion piston engine. Accordingly, commercial adaptation of the gas turbine engine in vehicle power systems necessitates development of means for overcoming the penalties inherent in operating the gas turbine engine over a wide range of power output.

SUMMARY OF THE INVENTION

According to this invention, an improved power system is provided which obviates or minimizes the problems associated with the power systems of the prior art. The power system of this invention includes a gas turbine engine, at least one flywheel, and a power responsive motion producing means. The gas turbine engine is adapted to power the flywheel whenever the flywheel falls below the preset rotational speed. The flywheel, on the other hand, is adapted to deliver energy to the power responsive motion producing means.

In more detail, the gas turbine engine includes the gas generator for compressing air and combusting fuel. Means are provided for mechanically connecting the gas turbine with the flywheel and variable drive transmission means is provided for connecting the flywheel through a drive shaft to the power responsive motion producing means. Automatic control means are provided for activating the gas generator whenever the rotational speed of the flywheel falls below a preset standard operational speed. Activation of the gas generator results in empowering the gas turbine. The gas turbine of course delivers this power to the flywheel thereby energizing it.

In one embodiment of the invention the gas turbine engine and flywheel are mechanically and operably connected by means of a simple gear speed changer.

In a particularly preferred embodiment of the present invention a motor vehicle is provided with the power system comprising in combination a gas turbine engine including a gas generator, at least one flywheel operably connected to a variable speed transmission to drive at least one of the wheels that propel the vehicle. The flywheel and gas turbine engine are mechanically connected by means of a simple gear speed changer. Additionally, automatic control means are provided to activate the gas turbine engine when the rotational speed of the flywheel falls below a set standard and to deactivate the gas generator when the rotational speed of the flywheel exceeds a set standard rotational speed.

The nature of the invention and its advantages will become apparent from the drawing and detailed descriptions set forth herein.

BRIEF DESCRIPTION OF THE DRAWINGS

The FIGURE is a representational block diagram of a vehicle power system according to the preferred embodiment of the invention.

DETAILED DESCRIPTION

Referring to the schematic representation of the invention, power-responsive motion producing means is depicted as a set of wheels 11 and 12 mounted on drive axle 10 and connected to transmission 15 via differential 14 to drive shaft 18 and flywheel 16. Gas turbine wheel 20 is rotably connected via drive shaft 24 to flywheel 16. The mechanical connection of the gas turbine to the flywheel is depicted in FIG. 1 as via a gear speed changer 31.

The gas turbine engine includes an air compressor shown in FIG. 1 as item 21, a combuster 22 and turbine wheel 20.

Fuel control means 30 is provided for activating and deactivating the gas generator. The control means preferably operate fuel valve 33 and air control valve 32.

In operation, flywheel 16 is energized by the gas turbine wheel 20. More specifically, the flywheel 16 and the gas turbine wheel 20 are designed to have operating speeds that are in rough correspondence and preferably are substantially similar. For example, the operating speed of the turbine and the flywheels could be in the range of 20,000 to 40,000 rpms each. This close correspondence of the operating speed of the turbine and the flywheel serves to simplify the drive mechanism in that the need for a major speed reduction step between the turbine and the flywheel is eliminated. Simple gear speed changer 31 provides an adequate mechanism for operably connecting the flywheel and gas turbine engine.

Returning again to the operation of the power system of the present invention, control means 30 activate the gas generator via fuel valve 33 and air valve 32. Air is thereby delivered via line 35 to compressor 21. Compressed air is subsequently delivered via line 36 to combustor 22 to which fuel has also been delivered via line 34 through valve 33. Fuel is delivered by a fuel line (not shown) through the valve 33 from the fuel tank (also not shown). Fuel and air are combusted and the gas generated thereby is delivered via line 37 to the gas turbine wheel 20 thereby empowering the turbine engine. Since the turbine is mechanically connected to the flywheel the empowered gas generator thereby energizes flywheel 16.

After the flywheel is sufficiently energized, that is, when the rotational speed of the flywheel exceeds a set standard rotational speed, control mechanism 30 deactivates the gas generator via control valves 32 and 33. Thus, gas turbine wheel 20 and compressor 21 rotate freely with flywheel 16 without delivering any power.

Consequently, the effectiveness of the flywheel is enhanced with the added rotation of the turbine wheel and compressor. Preferably, deactivated control valve 32 does not allow air to be delivered to the engine compressor. Thus, pumping losses that reduce engine efficiency during the deactivated period are avoided.

The kinetic energy stored in flywheel 16 is supplied to the power responsive motion producing means via drive shaft 18 and a suitable transmission 15 through differential 14 and axle 10. Transmission 15 preferably is an infinitely variable ratio device known in the art such as an automatic transmission. Optionally, a toric transmission may be employed. Another type of variable drive transmission that can be used to supply the flywheel power to motion producing means consists of an infinitely variable hydraulic pump. The hydraulic pump drives a hydraulic motor, the output of which rotates shaft 18, thereby driving wheels 11 and 12.

As stated above, flywheel 16 supplies power to the power responsive motion producing means. As a result of delivering the stored energy in the flywheel to the power responsive means there is a decrease in the rotational speed of the flywheel. Whenever the rotational speed of the flywheel falls below a set standard rotational speed, control mechanism 30 activates the gas generator in the manner previously described. Consequently, the gas turbine is again empowered and of course the flywheel is again energized.

This on-off operation of the gas turbine engine, i.e. the activation and deactivation of the gas generator, permits the engine to be operated at maximum efficiency and with minimum emission of harmful exhaust components. It further permits utilization of a relatively small simple cycle gas turbine engine empowering loads comparable to standard size automobiles. Since demands for peak power are placed on the flywheel and not the engine, operating the engine or gas generator on an on-off basis also reduces the total amount of combustion gases generated since the engine is not activated during an idle situation. Additionally, since the turbine wheel is rotating with the flywheel there is no significant time lag from activation to energizing conditions. Indeed activation is instantaneous and acceleration response is excellent.

Illustrative of relative dimensions of the various components applicable to a conventional sedan is the following:

| | | |
|---|---|---|
| Vehicle Wt. | 4,500 lbs. | 4,500 lbs. |
| Engine | | |
| Type | Simple Gas Turbine | Simple Gas Turbine |
| Horsepower | 100 | 100 |
| Weight | 100 lbs. | 100 lbs. |
| Power output at rear wheels | 80 HP | 80 HP |
| Rotational Speed | 40,000 rpm | 40,000 rpm |
| Operating frequency | Every 4 mins. | Every 110 mins. |
| Operating duration | 0.5 mins. | 13 mins. |
| Flywheel | | |
| Power output at rear wheels | 80 HP | 80 HP |
| Power output at flywheel | 95 HP | 95 HP |
| Energy output rating | 1.60 HP-Hr. | 43 HP-Hr. |
| Weight | 30 lbs. | 670 lbs. |
| Rotational Speed | 40,000 rpm | 40,000 rpm |
| Performance Capabilities | | |
| Top Speed, continuous | 90 mph | 90 mph |
| City Range (flywheel alone) | 1.5 miles | 40 miles |
| Range (intermittent operation with refueling stops) | Infinite | Infinite |

In a particularly preferred embodiment of the present invention for vehicle sizes as shown above, control means 30 is designed to deactivate the gas generator whenever the rotational speed of the flywheel reaches the design standard of 40,000 rpm. Also, for the same vehicle design, control means 30, preferably activates the gas generator whenever the rotational speed of the flywheel falls below 20,000 rpm. Of course, manual means such as a switch is incorporated in control device 30 so that the vehicle can be completely shut off when not in use.

It will be appreciated that many variations of this invention are possible. Notwithstanding any variations in parameters and design characteristics as set forth above, the power system of the present invention results in significant advantages, particularly with regard to reduction of air pollution and the maximization of efficiency of gas turbine operated vehicles.

What is claimed is:

1. A power system comprising, in combination:
   a gas turbine engine including a gas generator;
   at least one flywheel;
   means mechanically connecting said gas turbine engine and said flywheel whereby said gas turbine engine empowers said flywheel during operation of said gas generator and whereby said gas turbine engine rotates with said flywheel during deactivation of said gas generator;
   means for actuating said gas generator when said rotational speed of said flywheel drops below a set standard and for deactivating said generator when the rotational speed of said flywheel exceeds a set standard;
   a drive shaft connected to said flywheel;
   power-responsive motion producing means; and
   variable drive transmission means connecting said drive shaft and said power-responsive motion producing means to supply mechanical power from said flywheel to said motion producing means.

2. The power system of claim 1 wherein means for activating and deactivating said generator are automatic.

3. The power system of claim 1 wherein said turbine and flywheel are connected by a rotatable shaft.

4. The power system of claim 1 wherein the mechanical means for connecting said turbine and said flywheel includes a gear speed changer.

5. The power system of claim 1 wherein said variable drive transmission means is an automatic transmission.

6. The power system of claim 1 wherein said transmission means is a toric transmission.

7. The power system of claim 1 wherein said transmission means comprises an infinitely variable hydraulic pump that drives a hydraulic motor whereby mechanical power is supplied to said power-responsive motion producing means.

8. In a vehicle of the type including a frame, wheels disposed to propel said vehicle, and transmission means disposed to drive at least one of said wheels, the combination therewith comprising:
a flywheel operably connected to said transmission to supply mechanical energy from said flywheel to drive at least one of said wheels;
a gas turbine engine including a gas generator, said gas turbine being operably connected to said flywheel whereby said gas turbine engine empowers said flywheel during operation of said gas generator and whereby said gas turbine engine rotates with said flywheel during deactivation of said gas generator; and
means for activating said gas generator to empower said turbine to energize said flywheel when the rotational speed of said flywheel falls below a set standard and for deactivating said generator when the rotational speed of said flywheel at least reaches a set standard.

9. The power system of claim 1 wherein said means for actuating said gas generator includes valve means for controlling the flow of air and fuel to the gas generator.

* * * * *